Oct. 1, 1935.    L. E. GIRARD    2,016,108
DRY CELL
Filed Oct. 31, 1931

INVENTOR
Lamont E. Girard
BY
Pennie, Davis, Marvin & Edmonds
ATTORNEYS

Patented Oct. 1, 1935

2,016,108

UNITED STATES PATENT OFFICE 2,016,108

DRY CELL

Lamont E. Girard, Madison, Wis., assignor to Burgess Battery Company, Madison, Wis., a corporation of Wisconsin Application October 31, 1931, Serial No. 572,290

5 Claims. (Cl. 136—133)

This invention relates to improvements in dry cells and dry cell batteries and methods for making them. It relates particularly to dry cells of the bag or pasted type in which a metal cap is applied to the carbon rod before the latter is inserted into the zinc cup.

In the manufacture of such cells it is the custom to insert a washer of substantially the same diameter as the inner diameter of the zinc cup about the carbon rod and spaced slightly above the top of the cathode core to form an expansion space for gases formed during the discharge of the cell. A fusible seal is placed upon this washer to seal shut the top of the cell.

The central opening of the washer usually is made sufficiently large that it readily slips over the brass cap at the top of the carbon rod so that it fits very loosely about the carbon rod and exerts practically no centering effect upon the carbon rod and cathode core. In some instances the frictional resistance between the washer and the wall of the can is depended upon to hold the washer in its proper place until the sealing material has become set. This requires the use of washers and cans of exact dimensions. Furthermore, the cans must be perfectly round. In actual practice, difficulties are encountered due to the washers slipping down too far in the cans or tilting too much to one side, causing an uneven seal. If the washers are inserted by hand this condition is aggravated by careless workmanship. Furthermore, the sealing material sometimes runs down between the washer and the carbon rod and occupies a portion of the expansion space.

It is the object of this invention to provide a dry cell in which the difficulties mentioned heretofore are overcome and in which the top washer is supported in its position in such substantial manner that there is no tendency for it to become displaced.

It is the further object of the invention to provide a top washer for dry cells which so effectively closes the mouth of the zinc cup that it may be used as a temporary seal for the cell with advantages which will be pointed out hereinafter.

Briefly the objects of this invention are accomplished by providing a new type of top washer which is supported firmly in place and which centers the cathode core positively in the zinc cup.

In the accompanying drawing.

Figure 1:
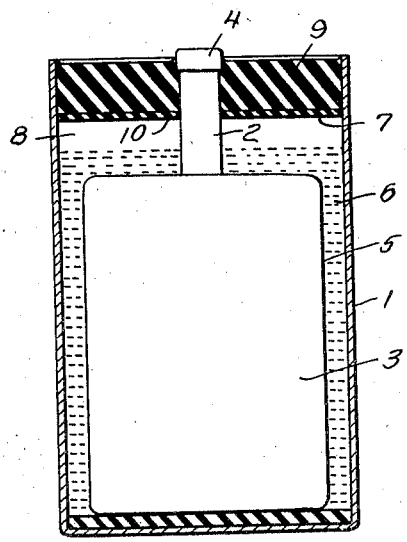
Fig. 1 is a vertical, sectional view of a completed cell constructed in accordance with my invention.
Figure 2:
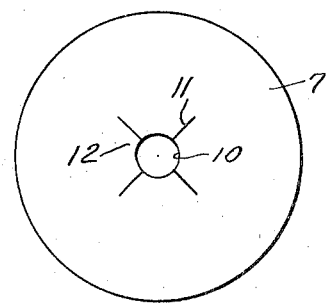
Fig. 2 is a plan view of my improved top or centering washer.

The dry cell shown in Fig. 1 consists of a zinc cup 1 containing a depolarizing cathode core consisting of a central carbon rod 2 about which is uniformly tamped a depolarizing mix 3 of carbon or graphite and a depolarizer such as manganese dioxide, conducting salts and water. The carbon rod has a metal cap 4, usually brass, mounted at the top thereof. The cathode core may be naked or may be surrounded by a bibulous envelope 5 of cheese-cloth, tissue paper or hardened dip such as is described in United States Patent No. 1,316,597 and may be insulated at the bottom by folding under the bibulous envelope or by dipping the bottom of the core into molten wax before inserting it into the cup. A suitable gelatinous or pasty electrolyte 6 separates the core from the cup. The electrolyte may be similar to that described in United States Patent No. 1,292,764 and may be compounded as described in United States Patent 1,370,056.

A washer 7 of waterproofed resilient insulating material, usually paraffined pressed paper board, such as chip board, is supported between carbon rod 2 and zinc cup 1 spaced above the top of depolarizing core 3 and electrolyte 6 to form expansion space 8. A wax or pitch seal 9 may be supported upon washer 8 to seal shut the mouth of the zinc cup.

Cap 4 usually is a cup shaped stamping from sheet metal which fits tightly upon the end of carbon rod 2 so that, as shown in Fig. 1, the outside diameter of the cap is greater than that of the carbon rod. The assembly of the component parts of the dry cell may be done by hand or by machine. In United States Patent No. 1,669,054 there is described a machine by means of which the various components of a dry cell are inserted in a can as it is automatically fed past a number of stations. The machine is adapted as well for inserting my improved top washer as it is for inserting the ordinary top washer.

My improved top washer has a central opening 10 of substantially the same diameter as that of carbon rod 2. Preferably, however, the opening is slightly less in diameter than the carbon rod. The difference need not be more than a few one thousandths of an inch. Extending outwardly and preferably radially from opening 10 are a plurality of spaced slits 11 which extend part way toward the periphery of the washer. The length of the slits varies with the size, thickness and stiffness of the washer and with the size of opening 10 but in one size of washer ordinarily used for flashlight and radio B-battery cells and which is about 1¼ inches in diameter and about 1/32 inch thick, slits about 1/16 inch long have been found to be satisfactory. Any suitable number of slits may be formed in the washer but for the type of washer just described four equally spaced slits have been found to give good results. Sections 12 of washer material are thus formed between slits 11.

In the assembling of the cell, with the metal cap at the top of the carbon rod, the cathode core is first inserted into the zinc cup 1 and then the electrolyte 6 is poured into the annular space between them and may also be made to fill part of the space above the top of depolarizing mix 3. Washer 7 is then pushed down over metal cap 4 and about carbon rod 2 at a level somewhat above the top of electrolyte 6. During passage of the washer over metal cap 4 sections 12 of the washer are deflected upwardly whereby opening 10 is enlarged the necessary amount. After the washer has passed beyond cap 4, sections 12, because of their resiliency, resume substantially their former positions relative to the remainder of the washer, that is, the washer returns to a substantially plane or flat shape. The washer is pushed down into the zinc cup by means of a plunger which is recessed to accommodate the carbon rod and the cap at its top. Such a plunger is described in Patent 1,669,054 referred to heretofore. The contacting surface of the plunger assists in restoring sections 12 to the common washer plane. There may be a slight curvature due to the fact that the diameter of opening 10 may be slightly less than that of carbon rod 2 but it is unnoticeable. The inner edges of the washer engage carbon rod 2 tightly and the washer is supported firmly in place. The carbon rod is usually molded and possesses a rougher surface than that of the zinc cup and for that reason supports the washer more firmly than does the zinc cup under substantially similar conditions. My improved washer centers the cathode core very accurately within the zinc cup.

After washer 7 is in place fusible sealing material in molten condition may be poured upon the washer to form seal 9.

In making multiple cell batteries it is the usual practice to store the freshly made individual cells for a period, sometimes as long as a month or more, before assembling them into batteries. This storing or ageing period is employed for the purpose of detecting defects which can not be detected by voltage and amperage tests at the time of manufacture. Defects will usually show up during such ageing period in the form of broken seals, caused by excessive gas formation, or in the form of leaks, etc. I have found that my improved washer permits economies of manufacture in that cells may be aged without the top seal 9. As stated heretofore, the washer is usually impregnated with paraffin and for my purpose care is taken that it is thoroughly impregnated. The washer is inserted into the cell and heat is applied to it. The paraffin liquefies or at least softens and flows into the slits and into the crevices between the washer and the carbon rod and zinc cup and forms a seal which is satisfactory for ageing purposes. After the cells are aged they may be assembled in a suitable container and electrically connected to form a battery. After the cells are assembled and connected, molten pitch or wax sealing compound may be poured upon the tops of all the cells and into the top portion of the container to form simultaneously the permanent seals of the cells and the seal of the battery.

Figure 3:
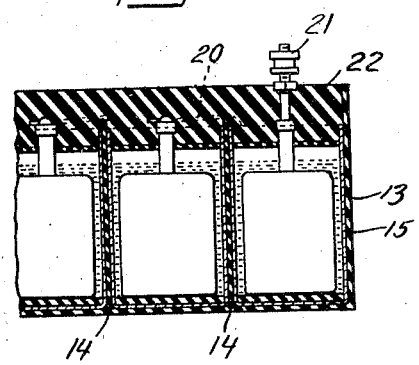
Fig. 3 is a broken sectional view of a multiple cell battery comprising a plurality of my improved dry cells.

Fig. 3 illustrates a battery constructed in the above manner. A battery of the same general character is described in United States Patent 1,408,140. Outer carton 13 contains the usual egg-crate type of partitions 14 which subdivide the carton into a number of compartments, each of the proper size to receive a dry cell. Each cell 15 is made up as described in connection with Fig. 1 with the exception that the seal is omitted from the top portion. The cells are connected in series or other desired electrical arrangement by means of conductors 20 and terminal 21 is connected to the terminal cell. The other terminals are similarly provided. After the cells are arranged in container 13 and are connected together and the terminals are arranged in their proper positions, molten sealing compound 22 is poured into the top portions of the cells and the top portion of the container is filled at the same time, creating a unitary seal for the cells and the container.

The heated washer provides a seal which is sufficiently air tight so that there is substantially no depreciation due to loss of moisture. Less fusible sealing compound is required for each cell and the washer may be placed nearer to the top of the zinc cup than in the case where the ordinary top washer is used. This allows more space above the cathode core so that more gases can be accommodated without injury to the cell. If there is no need for greater expansion space the height of the cathode core may be increased, resulting in increased capacity of the cell.

I claim:

1. In a dry cell, a cylindrical carbon pole and a washer fitting tightly upon said pole, said washer having a central opening and having slits extending outwardly from the central opening thereof and terminating intermediate said central opening and the periphery of the washer.

2. In a dry cell, a cylindrical carbon pole having a metal cap, and a resilient insulating washer having a central opening and fitting tightly upon said carbon pole, said washer having slits extending outwardly from the central opening thereof a portion of the distance to the periphery thereof.

3. In a dry cell, a zinc cup, a carbon pole having a metal cap at the top thereof disposed substantially centrally within said cup, and a resilient insulating washer fitting about the upper portion of said carbon rod and against the interior surface of said zinc cup, said washer being impregnated with paraffin and having a central opening originally of a diameter slightly less than that of said carbon rod and having slits extending outwardly from said opening toward the periphery of said washer, the paraffin of said washer being pressed in the crevices of said washer and between said washer and said zinc cup and said carbon rod.

4. The method of making dry cells which comprises forming a washer of paraffin impregnated resilient material with a central opening and with slits extending from said opening part way to the periphery thereof, disposing a carbon rod substantially centrally within a zinc cup, said carbon rod having a diameter substantially equal to that of said opening and said zinc cup having an inside diameter substantially equal to the outer diameter of said washer, placing said washer about said carbon rod whereby said washer fits tightly upon said carbon rod and within said zinc cup and applying heat to said washer.

5. The method of making dry cells which comprises forming a washer of paraffin impregnated resilient material with a central opening and with slits extending from said opening part way to the periphery thereof, disposing a carbon rod substantially centrally within a zinc cup, said carbon rod having a diameter substantially equal to that of said opening and said zinc cup having an inside diameter substantially equal to the outer diameter of said washer, placing said washer about said carbon rod whereby said washer fits tightly upon said carbon rod and within said zinc cup, applying heat to said washer, and allowing said cell to age.

LAMONT E. GIRARD.